United States Patent
Traeder et al.

(10) Patent No.: US 6,803,066 B2
(45) Date of Patent: Oct. 12, 2004

(54) SANITIZING FOOD PRODUCTS

(75) Inventors: Terry Jay Traeder, Aurora, IL (US); Richard Minzenberger, New Lennox, IL (US); Liangji Xu, Downers Grove, IL (US); Richard Gaber, Clarendon Hills, IL (US)

(73) Assignee: Praxair Technology, Inc., Danbury, CT (US)

( * ) Notice: Subject to any disclaimer, the term of this patent is extended or adjusted under 35 U.S.C. 154(b) by 28 days.

(21) Appl. No.: 09/761,707

(22) Filed: Jan. 18, 2001

(65) Prior Publication Data

US 2002/0094363 A1 Jul. 18, 2002

(51) Int. Cl.[7] ................................................. A23B 7/00
(52) U.S. Cl. ........................ 426/333; 426/331; 426/335; 426/305; 426/302; 426/310
(58) Field of Search ................................ 426/333, 335, 426/305, 302, 310, 532

(56) References Cited

U.S. PATENT DOCUMENTS

| | | | |
|---|---|---|---|
| 3,882,817 A | 5/1975 | Zink ........................... 118/126 |
| 4,376,130 A * | 3/1983 | Astrack et al. .............. 426/253 |
| 4,409,188 A | 10/1983 | Silberzahn ................... 422/303 |
| 4,477,287 A | 10/1984 | Kush et al. .................... 134/15 |
| 4,549,477 A * | 10/1985 | McCabe, Jr. .................. 99/477 |
| 4,770,884 A | 9/1988 | Hill et al. .................... 426/332 |
| 4,827,727 A * | 5/1989 | Caracciolo ...................... 62/63 |
| 4,849,237 A * | 7/1989 | Hurst .......................... 426/332 |
| 5,011,599 A * | 4/1991 | Kearney et al. ............. 210/150 |
| 5,011,699 A * | 4/1991 | Mitsuda et al. .............. 426/320 |
| 5,015,442 A * | 5/1991 | Hirai ........................... 422/121 |
| 5,053,140 A * | 10/1991 | Hurst ........................... 210/704 |
| 5,093,140 A | 3/1992 | Watanabe ..................... 426/326 |
| 5,213,759 A * | 5/1993 | Castberg et al. ............... 422/24 |
| 5,227,184 A * | 7/1993 | Hurst .......................... 426/312 |
| 5,325,893 A | 7/1994 | Takagi et al. ................ 138/143 |
| 5,431,939 A * | 7/1995 | Cox et al. .................... 426/300 |
| 5,460,833 A | 10/1995 | Andrews et al. ............. 424/606 |
| 5,700,505 A * | 12/1997 | Hurst .......................... 426/312 |
| 5,783,242 A * | 7/1998 | Teague ........................ 426/320 |
| 5,849,678 A | 12/1998 | Murch et al. ................ 510/111 |
| 5,858,430 A * | 1/1999 | Endico ........................ 426/241 |
| 5,858,435 A * | 1/1999 | Gallo .......................... 426/320 |
| 5,927,304 A * | 7/1999 | Wen ............................ 134/153 |
| 6,066,348 A * | 5/2000 | Yuan et al. .................. 426/236 |
| 6,171,625 B1 * | 1/2001 | Denvir et al. ................ 426/320 |
| 6,200,618 B1 | 3/2001 | Smith et al. ................. 426/320 |
| 6,294,211 B1 * | 9/2001 | Yuan et al. .................. 426/235 |
| 6,348,227 B1 | 2/2002 | Caracciolo, Jr. ............. 426/332 |

OTHER PUBLICATIONS

"Exair ® Standard Air Knife", pp. 1–4 (Dec. 19, 2000).

* cited by examiner

Primary Examiner—Carolyn Paden
(74) Attorney, Agent, or Firm—Donald T. Black

(57) ABSTRACT

Food products are sanitized by spraying an aqueous sanitizing liquid comprising up to 15 ppm ozone onto all exterior surfaces of the product from a plurality of directions while moving the food product laterally with respect to the sprays, wherein the velocity of each spray is sufficient to wet microbes adhered to the surface of the food product, maintaining contact between the sanitizing liquid and the product for at least a time effective to maximize wetting of the surface of the food product by the sanitizing liquid, and then removing mechanically at least 75% of the liquid from the food product.

14 Claims, 1 Drawing Sheet

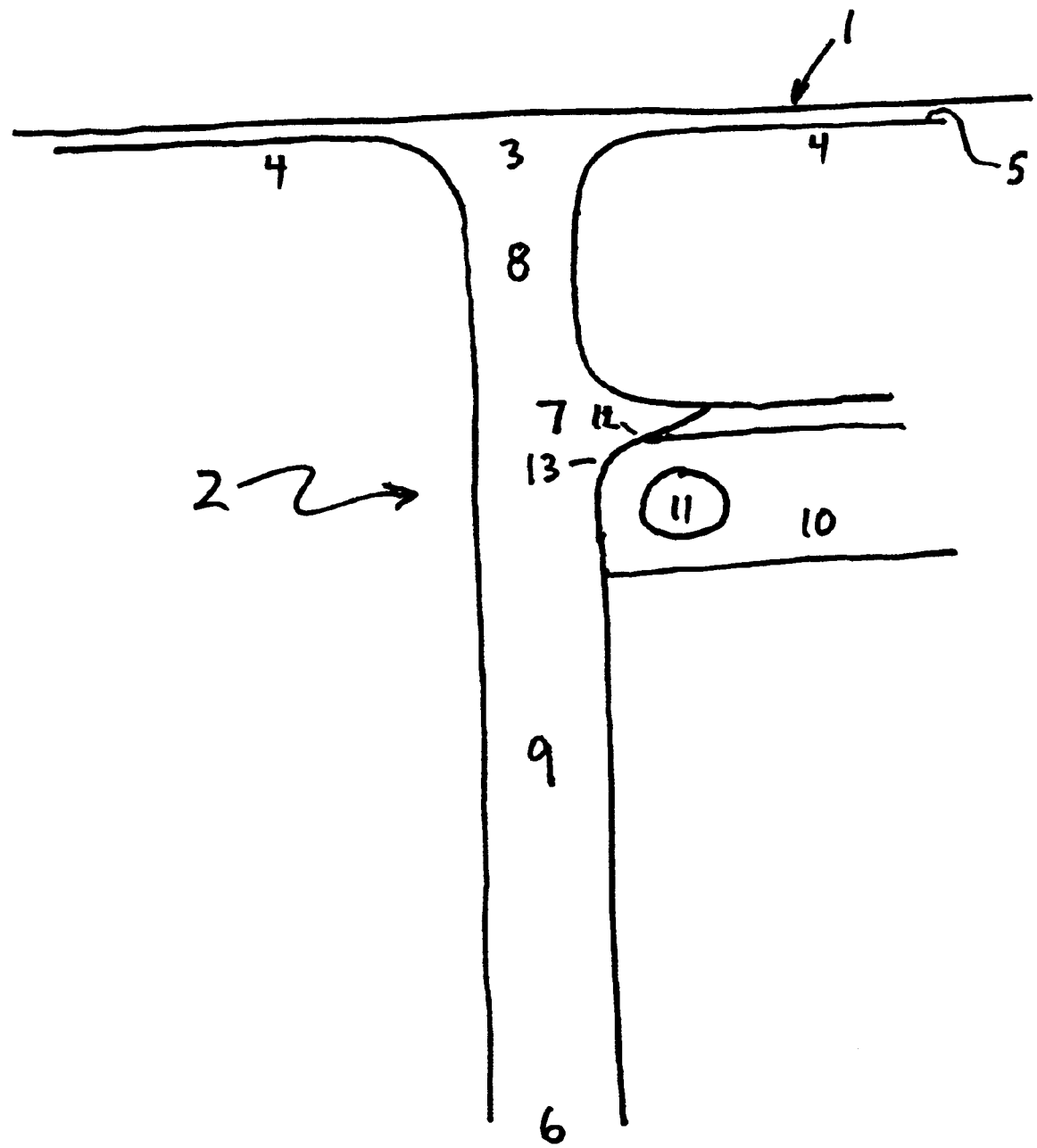

SANITIZING FOOD PRODUCTS

FIELD OF THE INVENTION

This invention relates to sanitizing food products, which preserves their appearance and extends their shelf life.

BACKGROUND OF THE INVENTION

As one technique for sanitizing a food product, it is desirable to eliminate microbial contamination from the surface of the food product before the food product is presented to the consumer for consumption.

Conventionally, food products have been sanitized by immersing the food product in a water bath or in a flowing stream of water containing such sanitizing agent, following which the food product is centrifuged to remove water. This is a relatively unsatisfactory technique because the product retains so much water that retaining the physical properties, freshness and attractive appearance of the original product becomes difficult.

It has also been proposed in the past to employ ozone, or aqueous solutions containing ozone, to clean food products. The prior art disclosures concerning this proposal are also lacking in understanding of how to achieve superior shelf life extension. For instance, U.S. Pat. No. 5,858,435 discloses a method of cleaning produce that includes the steps of rotating the produce on a conveyor while spraying it with a mixture of water and ozone, and brushing the produce with a rotating brush head so as to dislodge dirt, mold and the like from the produce by the rotating brushes, followed by another step wherein a mixture of water and ozone is applied to the produce and the produce is then treated to remove excess water from the exterior thereof, and as a final step a food grade wax is applied to the produce. This technique is completely unsuitable for many types of food products. The physical action of the brushes can dislodge or tear the food product, rendering it less visually attractive to the consumer, while in addition the brushes can not only pick up the dirt that may have been present on the food product, but also pick up shreds of the food product itself. This necessitates periodic cleaning of the brush bed, so the brush bed must be considered to be a source of fresh contamination for the food product. This patent also fails to recognize the significance to shelf life of the presence of water on the food product and within interstices of the food product. Indeed, the requirement in this patent of applying a layer of wax onto the food product confirms a failure to appreciate the significance of maximizing removal of residual water from within interstices of the food product in order to obtain a desired increase in the shelf life of the food product.

Thus, there remains a need for methods for rapidly, efficiently and effectively sanitizing food products.

BRIEF SUMMARY OF THE INVENTION

One aspect of the present invention is a method of sanitizing a food product, comprising.

applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product, wherein the sanitizing liquid comprises ozone at a concentration of up to 15 ppm, and preferably also comprises at least one agent which inactivates food microbes wherein said agent is present in a concentration sufficient to inactivate food microbes, maintaining contact between said sanitizing liquid and said food product for at least a time effective to maximize wetting of the surface of the food product by the sanitizing liquid containing said at least one agent, and then removing mechanically at least 75% of said liquid from said food product.

In a preferred embodiment, the removal of liquid is effected by positioning beneath the food product a device comprising a main conduit oriented vertically and open at its upper and lower ends, and preferably having at its upper end an annular flange terminating in a planar top surface, an air knife means sealingly connected to an opening in the side of said main conduit and positioned in said opening to eject air or other gas downward in said main conduit, wherein the inside diameter of the main conduit between said opening and said upper end is less than the inside diameter of the main conduit below said opening, wherein the portion of the main conduit downstream of said opening, beginning from said opening, exhibits an expansion angle of up to 3 degrees and preferably greater than 0.5 degrees for a distance at least 6 times the diameter of the main conduit at said connection, and gas supply means in fluid communication with the inlet of said air knife means for blowing gas into said inlet at a velocity sufficient that said gas is ejected into said main conduit at a sufficient velocity to draw air and any liquid entrained in the air into said upper end and out said lower end, and actuating said gas supply means so as to draw liquid off of food product positioned over said device.

The method of this invention also prolongs the appearance of freshness of food products, especially vegetables and fruits. That is, the method of the present invention retards the loss of the fresh appearance of the food product.

BRIEF DESCRIPTION OF THE DRAWING

The FIGURE is a cross-sectional view of a device useful in removing liquid from food products in the practice of this invention.

DETAILED DESCRIPTION OF THE INVENTION

As used herein, the term "food product" is meant to include any edible vegetable or animal-source product, cooked or uncooked, whether or not intact or already subdivided into portions or pieces, and includes products which are added to preparations made from food products but which are themselves not necessarily consumed, such as spices, seasonings, and herbs. Examples include, without limitation, whole animal carcasses, portions of animal carcasses, individual mouth-sized pieces cut from animal carcasses, whole vegetables and fruits, pieces of vegetables, and pieces of fruits.

The "exterior surfaces" of a food product are the surfaces that can be seen by the naked eye.

By the "surfaces" of a food product is meant not only the exterior surfaces but also the surfaces in any interstices of the food product.

By "interstices" is meant irregularities, discontinuities, fissures, openings, spaces and cracks of any sort, in a food product, whether appearing in the surface of what might be considered a unitary piece such as raspberry or appearing between what might be considered severable portions of a food product such as between the leaves of a head of lettuce.

The term "mechanically" is meant to embrace techniques that remove water from the interstices of the food product without requiring thermal action such as an increase in the temperature, and without relying solely on gravity. Examples include spinning (by which is meant rotating the food product by itself or in a group with other food products so as to dislodge liquid from the food product by centrifugal force), shaking (by which is meant agitating the food product other than by spinning it, so as to dislodge liquid from the food product faster than would be the case relying solely on gravity), subjecting the food product to physical aids such as an air knife or vacuum, and the like. It will be understood that any such techniques can be carried out at any given temperature but they do not rely on increasing the temperature for their effectiveness.

By "lowermost" is meant, when the inlet conduit has a planar bottom surface, that surface, and when the inlet conduit has a bottom surface that is curved, the portion of the bottom surface below the longest line that can be drawn, in a plane perpendicular to the axis of the inlet conduit, across the inlet conduit.

The phrase "exhibits an expansion angle of up to 3 degrees" means that in at least one cross-section of the main conduit taken in a plane in which the axis of the main conduit lies, a line created by the intersection of the main conduit with such plane forms an angle (the "expansion angle") with respect to the axis of up to 3 degrees.

In this invention, a sanitizing liquid is applied to all accessible surfaces of the food product by spraying it onto all external surfaces of the food product.

The sanitizing solution contains ozone, at a concentration up to 15 ppm and preferably from 0.1 to 5 ppm. Ozone solutions can be formed by means conventional in the art, wherein a conventional ozone generator generates a gaseous stream of ozone, which is sparged into a stream or tank of water so as to form a solution having the desired concentration of ozone in the water.

Preferably, the sanitizing liquid also contains one or more agents effective to inactivate food microbes present on the food product. An agent that would be useful in this invention must leave no toxic residue on the food product, must be approved by governmental regulations for use on food products, and must be effective to inactivate microbes. Many such agents are known in the food treatment field. Examples include solutions of chlorine, chlorinated and brominated compounds, edible organic acids, of which the preferred examples are malic, lactic and citric acids, and edible inorganic acids and salts such as phosphoric acid and its sodium salts such as trisodium phosphate.

The concentration of the agent should be that which is effective to inactivate microbes. The effective concentration will vary with various agents, and with the length of time that the agent is in contact with the food product, but the effective concentration can readily be determined from published sources or by routine testing. Amounts can be from 50 or even 100 ppm up to several percent by weight. It will be recognized that the effective concentration is also a function of the contact time between the food product and the sanitizing liquid.

The sanitizing liquid can optionally but preferably contain a surfactant which in the amount used is physiologically nontoxic, in an amount effective to increase the effectiveness of the sanitizing liquid in dislodging microbes from the surface of the food product when used as described herein. Examples of suitable surfactants for this purpose include polyethylene glycol (PEG) having a molecular weight of 100 to 100,000. The amount of surfactant present in the sanitizing liquid can be in the range of 0.01 wt. % to 0.5 wt. %.

One significant and unexpected advantage of the combination of ozone with the antimicrobial agent is that the combination in the sanitizing liquid provides rapid sanitizing, shelf life prolongation, and retention of the fresh appearance of the food product, with the use of less of the ozone and less of the agent than would be expected if either were used without the other.

The sanitizing liquid is applied to all external surfaces of the food product, at a velocity which is sufficient to dislodge microbes from the surface of the food product. Suitable velocities are at least 25 feet per second up to about 200–250 feet per second at the food product surface. Too slow a velocity fails to dislodge microbes sufficiently, and too high a velocity damages the surface of the food product.

For instance, the sanitizing liquid can be applied in a plurality of sprays to the surface of the food product, at a velocity sufficient so that at the points at which the liquid impinges on the surface of the food product, microbes are dislodged from the surface of the food product. By "sprays" is meant any flow of the liquid, whether applied through a wide angle or in a narrow stream or jet, by which the liquid impinges on the food product surface at sufficient velocity to achieve the objects described herein.

The sanitizing liquid is applied while the food product is moving laterally with respect to the sprays. By "laterally" is meant that the food product is moving at an angle to the axis of the spray, rather than moving only directly toward or away from the spray.

Specific apparatus useful in this regard depends somewhat upon the geometry of the food product. Relatively round products can be moved by a roller-bar type of conveyor or a relatively conventional conveyor system under, over, or through a multi-nozzle spray manifold. Smaller products can be treated using a multi-step flighted conveyor, passing through several spray manifolds. Cut produce and similarly shaped food products cut from animal carcasses can be treated in a device presenting a rotating drum, which presents the additional feature that continuous feeding of the product can be effected through the drum, with the sanitizing liquid being applied via an internal spray manifold. Such a system can also be operated on a batch basis. It will be noted that movement of the food product relative to the spray can be effected by moving the food product while the spray remains stationary, moving the spray while the food product remains stationary, or moving both.

In a preferred embodiment, the food product is carried on a conveyor (such as an endless belt) which can be slotted to permit excess liquid to pass through the conveyor, while the conveyor passes between sprays located above and below the conveyor. Preferably, in such an arrangement there are at least two sprays above the conveyor and at least two sprays below the conveyor.

Following passage of the food product in contact with the sprays of the sanitizing liquid, additional contact time of the sanitizing liquid with the food product of at least 5 seconds, preferably at least 30 seconds, should be provided. This can be provided by continuing to have the food product travel along a conveyor, by holding the food product at a holding station, or otherwise as desired by the operator. This time permits effective sanitizing in that sanitizing liquid is able to achieve maximal wetting of the surfaces of the food product. That is, the solution acts at the exterior surface of the food product and is also able to penetrate into any interstices of the food product. This interstitial penetration is another unexpected advantage of the present invention in that operation with the sanitizing liquid according to this invention permits the sanitizing liquid to penetrate farther into interstices of the food product than has been attainable with other liquid sanitizing compositions.

The sanitizing liquid is then removed from the food product. Removal must be effected in a manner which removes at least 75% of the sanitizing liquid present from the food product. This extent of removal is an essential aspect of the present invention, as the food product exhibits a much longer shelf life than heretofore achievable. Indeed, the ease of removal and the extent of removal of the sanitizing liquid exceeds that previously believed achievable. Removal of much higher percentages of the liquid from food products having smooth outer surfaces and no (or few) interstices, is of course achievable compared to food products with many more interstices.

Effective means for achieving this extent of removal of the sanitizing liquid from the food product include those disclosed above with respect to the definition of mechanical modes of water removal. For instance, liquid can be removed by shaking in a wire mesh basket or similar device; by spinning in a rotating drum having openings in its walls; by application to the food product of a vacuum to remove the liquid; and/or by application of an air knife. The liquid is thereby removed more rapidly, and more completely, than had been available in previous techniques.

This aspect of the present invention provides the additional benefit that the sanitizing liquid can be much more effectively removed from the food product (i.e. the surfaces of the food product can be dewatered) far more effectively than in previous technologies. This discovery renders the present invention all the more surprising in that, even though during the overall method of this invention the surfaces of the food product including the interstitial surfaces contain more liquid than previously attainable (due to the higher extent of penetration of the sanitizing liquid into the interstices), the invention still successfully removes such an unexpectedly high percentage of the liquid from the food product.

A preferred device for removing the sanitizing liquid from the food product is depicted in cross-section in the FIGURE. The device is positioned by any conventional mode of support beneath conveyor 1 which carries pieces of food product.

The device includes a main conduit 2 open at its upper end 3. For convenience, upper end 3 can terminate in an annular flange 4 having a planar top surface 5. The planar top surface 5, placed in close proximity to the underside of conveyor 1, facilitates removal of water from food product on the conveyor above. The main conduit 2 is also open at its lower end 6.

An opening 7 is provided in the side of the main conduit 2. The inside diameter of the portion 8 of the main conduit 2 that is between the opening 7 and the upper end 3 of the main conduit 2 is less than the inside diameter of the portion 9 of the main conduit 2 that is below the opening 7. The difference in diameters preferably corresponds to the ratio (diameter of portion 9):(diameter of portion 8)=1.1–1.25. Typically the diameter of portion 8 is about 0.5 inches, and typically the diameter of portion 9 is about 0.625 inches. The portions are coaxial.

Portion 8 can be of any length and can even be as short as practicable, allowing only enough structure to form the intersection with opening 7.

The main conduit can be of rectangular cross-section, resembling conventional ductwork. It also can be of pipe, having a circular or nearly circular cross-section. Rectangular cross-sectional construction is preferred. The conduit is preferably made of metal but can be made of polymeric material as long as the walls are sufficiently firm that application of air pressure as described herein does not cause the walls of the conduit to expand or collapse.

An air knife 10 or equivalent means is sealingly fitted into opening 7. The air knife includes an air inlet 11 which communicates with a very narrow gap 12 which is the air outlet. The width of gap 12 is typically 2 to 3 thousandths of an inch. The gap directs air (or other gas) exiting gap 12 onto a curved surface 13 having a radius of 4 to 8 millimeters. Providing this curvature permits the air that exits gap 12 to follow a quarter-circular path smoothly around that curved surface (the "Coanda effect") and downward into the lower portion 9 of the main conduit. This enables much greater air flow and water removal into the upper opening of the main conduit Air knives suitable for this application are commercially available.

Portion 9 should be at least 6 times its inside diameter, such as about 4 inches or more for a conduit 0.625 inches in diameter. The end of conduit 9 can feed into an open or closed container, or can be connected to a discharge line that conveys material to a drain or sewer.

The lower portion 9 of the main conduit should exhibit an expansion angle as defined herein. Thus, the cross-sectional area of the main conduit is less, at the intersection with the inlet conduit, than further down the main conduit. It is convenient to define this greater cross-sectional area in terms of the angle formed by at least one side of the main conduit with respect to the axis of the main conduit.

The necessary expansion can be provided in a variety of ways, such as having one side of a rectangular duct be at a small angle off-square with respect to the other three sides. More than one side of a conduit can be at the required angle to help provide the necessary expansion angle. If the conduit is cylindrical, it can be provided with a flared area (resembling the snow horn on the end of a fire extinguisher but at a smaller angle).

Air inlet 11 is connected in fluid communication with any suitable source of air (or steam or other gas or mixture of gases) under pressure for blowing gas (preferably air) into inlet 11 at a velocity sufficient so that air exits gap 12 into the main conduit at a sufficient velocity to draw air and any liquid entrained in the air into upper end 3 and out lower end 6. Useful sources of air or other gas under pressure include blowers and fans, as well as compressed gas cylinders and compressors. An effective gas velocity exiting gap 12 is on the order of 10 to 25 meters per second, preferably about 20 meters per second. Actuating the air knife draws liquid off of food product positioned over said the top opening 3, and the liquid is then conveyed away from the product. This device achieves liquid removal with few moving parts that could become contaminated or fouled by debris coming off of the food product. The device can be cleaned more easily, and more safely, than other devices for liquid removal.

The method of this invention achieves killing of deleterious enzymes from the food product surface. The method also prolongs the fresh appearance, that is, the appearance of the product when it is removed from the plant on which it grew. For instance, a green leaf of lettuce remains green with no accumulation of brown spots or brown regions on the edges of the lettuce leaf, for a period of time longer than would be expected.

In an optional next step, the food product is passed through an aqueous mist comprising a preserving agent. The aqueous mist is usually a solution or dispersion of the preserving agent. Useful preserving agents include any which are nontoxic and approved by governmental authorities for application to food products, and which are effective in prolonging the fresh appearance, the moisture content, or the freedom from spoilage, of the food product. Examples of useful preserving agents include citric acid, acetic acid, peracetic acid, hydrogen peroxide, and halogenated compounds. Other useful agents are readily identified and apparent to those familiar with the food processing field.

In another optional but preferred embodiment, the sanitizing liquid which is removed from the food product is recycled and reused to treat additional food product. Thus, the liquid is recovered as it is removed from the food product, strained/filtered to remove solid particles, sterilized (before or after removal of solid particles) by e.g. ozonation, and recycled for reapplication to additional food product. Makeup water is added to replace water which is carried out on or within the product or which is otherwise lost or spilled.

A distinct benefit of ozone washing is the ozone's decomposition back into oxygen when recycling the water. Chlorine and other halogens accumulate when filtering and recycling wash water. The quick microbe kill and enzyme halting reactions of ozone washing are beneficial. That ozone is a non-selective oxidant and is easily used up oxidizing other matter in the water is advantageous and disadvantageous. Depleting ozone for the removal of color and organic compounds in waste water is a benefit. But the amount of ozone required to maintain a microbe killing residual can be very high and the generation of ozone is relatively expensive.

The system of the present invention removes biological load with auto strainers, replaceable bag filters and disposable filter elements. The removal of most of the plant tissue and field soil allows the minimum amount of ozone in filtered water to maintain a microbe killing residual. A second benefit is that when production is rushed, such as during the height of the harvesting season, fresh water can easily replace or be added to the cleaning capacity of the washer.

By using a combination of recycled and fresh water additional capacity is available for processing the food products.

Removing the field heat from products is important to slowing down product respiration, which in turn prolongs the freshness of the food product. The recycling of the cold water within the ozone washer with additional refrigeration imposes a smaller cooling load then would be the case in carrying out the complete water cooling by always starting with warm fresh water. Ozone is much more soluble in colder water, therefore it is also beneficial that less cold water is able to carry more ozone.

For this reason, it is preferred to carry out the method of the present invention with water that is 65° F. or cooler.

An additional benefit that is accrued by recycling ozonated water is control. The reservoir and water contained in the process become a buffer to rapid ozone level changes. Dissolved ozone levels will change more slowly, because the control is working on a larger volume as compared to a in line treatment system. Ozone is beneficial in that it adds dissolved oxygen and eventually reduces both BOD and COD demands. Recycling also keeps hazardous ozone levels contained within the system where they can properly be disposed of by an ozone destruct system. Open systems are avoided which could allow strong unreacted ozone solutions to spill or run off into public sewers or waterways before being treated.

What is claimed is:

1. A method of sanitizing a food product, comprising
applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product,
wherein the sanitizing liquid comprises ozone at a concentration of up to 15 ppm, wherein the sanitizing liquid also comprises a surfactant in an amount which is physiologically nontoxic,
maintaining contact between said sanitizing liquid and said food product for at least a time effective to maximize wetting of the surface of the food product by the sanitizing liquid containing said at least one agent,
and then removing mechanically at least 75% of said liquid from said food product.

2. A method of sanitizing a food product, comprising
applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product,
wherein the sanitizing liquid comprises ozone at a concentration of up to 15 ppm,
maintaining contact between said sanitizing liquid and said food product for at least a time effective to maximize wetting of the surface of the food product by the sanitizing liquid containing said at least one agent,
and then removing mechanically at least 75% of said liquid from said food product wherein after the step in which at least 75% of said sanitizing liquid is removed from the food product, the food product is passed through an aqueous mist which comprises a preserving agent.

3. A method of sanitizing a food product, comprising
applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product,
wherein the sanitizing liquid comprises ozone at a concentration of up to 15 ppm,
maintaining contact between said sanitizing liquid and said food product for at least a time effective to maximize wetting of the surface of the food product by the sanitizing liquid containing said at least one agent,
and then removing mechanically at least 75% of said liquid from said food product wherein sanitizing liquid removed from said food product is recycled and applied to additional food product.

4. A method of sanitizing a food product, comprising
applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product, wherein the sanitizing liquid comprises ozone at a concentration of up to 15 ppm, wherein said sanitizing liquid also comprises in addition to said ozone at least one agent which inactivates food microbes wherein said agent is present in a concentration sufficient to inactivate food microbes, maintaining contact between said sanitizing liquid and said food product for at least a time effective to maximize wetting of the surface of the food product by the sanitizing liquid containing said at least one agent, and then removing mechanically at least 75% of said liquid from said food product.

5. A method of prolonging the appearance of freshness of a food product which is a vegetable or fruit, comprising applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product, wherein the sanitizing liquid comprises ozone at a concentration of up to 15 ppm, wherein the sanitizing liquid also comprises a physiologically nontoxic surfactant, maintaining contact between said sanitizing liquid and said food product for at least a time effective to maximize wetting of the surface of the food product by the sanitizing liquid containing said at least one agent, and then removing mechanically at least 75% of said liquid from said food product.

6. A method of prolonging the appearance of freshness of a food product which is a vegetable or fruit, comprising applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product, wherein the sanitizing liquid comprises ozone at a concentration of up to 15 ppm, maintaining contact between said sanitizing liquid and said food product for at least a time effective to maximize wetting of the surface of the food product by the sanitizing liquid containing said at least one agent, and then removing mechanically at least 75% of said liquid from said food product wherein after the step in which at least 75% of said sanitizing liquid is removed from the food product, the food product is passed through an aqueous mist which comprises a preserving agent.

7. A method of prolonging the appearance of freshness of a food product which is a vegetable or fruit, comprising applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product, wherein the sanitizing liquid comprises ozone at a concentration of up to 15 ppm, maintaining contact between said sanitizing liquid and said food product for at least a time effective to maximize wetting of the surface of the food product by the sanitizing liquid containing said at least one agent, and then removing mechanically at least 75% of said liquid from said food product wherein sanitizing liquid removed from said food product is recycled and applied to additional food product.

8. A method of prolonging the appearance of freshness of a food product which is a vegetable or fruit, comprising applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product, wherein the sanitizing liquid comprises ozone at a concentration of up to 15 ppm, wherein said sanitizing liquid also comprises in addition to said ozone at least one agent which inactivates food microbes wherein said agent is present in a concentration sufficient to inactivate food microbes, maintaining contact between said sanitizing liquid and said food product for at least a time effective to maximize wetting of the surface of the food product by the sanitizing liquid containing said at least one agent, and then removing mechanically at least 75% of said liquid from said food product.

9. A method of sanitizing a food product, comprising applying an aqueous sanitizing liquid onto the food product by spraying it onto all exterior surfaces of the food product from a plurality of directions while moving the food product laterally with respect to the sprays, wherein the velocity of each spray is sufficient to wet microbes adhered to the surface of the food product, wherein the sanitizing liquid comprises ozone at a concentration of up to 15 ppm, maintaining contact between said sanitizing liquid and said food product for at least a time effective to maximize wetting of the surface of the food product by the sanitizing liquid containing said at least one agent, and then removing mechanically at least 75% of said liquid from said food product further comprising removing liquid from said food product by positioning beneath the food product a device comprising a main conduit oriented vertically and open at its upper and lower ends, and preferably having at its upper end an annular flange terminating in a planar top surface, an air knife means sealingly connected to an opening in the side of said main conduit and positioned in said opening to eject air or other gas downward in said main conduit, wherein the inside diameter of the main conduit between said opening and said upper end is less than the inside diameter of the main conduit below said opening, wherein the portion of the main conduit downstream of said opening, beginning from said opening, exhibits an expansion angle of up to 3 degrees for a distance at least 6 times the diameter of the main conduit at said connection, and gas supply means in fluid communication with the inlet of said air knife means for blowing gas into said inlet at a velocity sufficient that said gas is ejected into said main conduit at a sufficient velocity to draw air and any liquid entrained in the air into said upper end and out said lower end, and actuating said gas supply means so as to draw liquid off of food product positioned over said device.

10. A method according to claim 9 wherein said expansion angle is at least 0.5 degree.

11. A method according to claim 9 wherein the sanitizing liquid also comprises a physiologically nontoxic surfactant.

12. A method according to claim 9 wherein after the step in which at least 75% of said sanitizing liquid is removed from the food product, the food product is passed through an aqueous mist which comprises a preserving agent.

13. A method according to claim 9 wherein sanitizing liquid removed from said food product is recycled and applied to additional food product.

14. A method according to claim 9 wherein said sanitizing liquid also comprises in addition to said ozone at least one agent which inactivates food microbes wherein said agent is present in a concentration sufficient to inactivate food microbes.

* * * * *